US009405939B2

(12) United States Patent
Ford et al.

(10) Patent No.: US 9,405,939 B2
(45) Date of Patent: Aug. 2, 2016

(54) DATA PROCESSING ON A NON-VOLATILE MASS STORAGE DEVICE (75) Inventors: Simon Andrew Ford, Cambridge (GB); Christopher James Styles, Cambridge (GB)

(73) Assignee: ARM LIMITED, Cambridge (GB)

( * ) Notice: Subject to any disclaimer, the term of this patent is extended or adjusted under 35 U.S.C. 154(b) by 2262 days.

(21) Appl. No.: 12/285,516

(22) Filed: Oct. 7, 2008

(65) Prior Publication Data

US 2010/0088524 A1    Apr. 8, 2010

(51) Int. Cl.
| | |
|---|---|
| G06F 15/16 | (2006.01) |
| G06F 21/80 | (2013.01) |
| G06F 21/56 | (2013.01) |
| G06F 21/78 | (2013.01) |
| G06F 21/71 | (2013.01) |
| G06F 21/12 | (2013.01) |
| H04L 29/06 | (2006.01) |

(52) U.S. Cl.
CPC ............. *G06F 21/80* (2013.01); *G06F 21/123* (2013.01); *G06F 21/56* (2013.01); *G06F 21/71* (2013.01); *G06F 21/78* (2013.01); *G06F 2221/2129* (2013.01); *H04L 63/061* (2013.01)

(58) Field of Classification Search
CPC . G06F 2221/2129; G06F 21/80; G06F 21/56; G06F 21/71; G06F 21/78; G06F 21/123; H04L 63/061
USPC .......................................... 709/213, 216, 217
See application file for complete search history.

(56) References Cited

U.S. PATENT DOCUMENTS

| | | | | |
|---|---|---|---|---|
| 6,535,243 | B1* | 3/2003 | Tullis | 348/207.1 |
| 6,606,695 | B2* | 8/2003 | Kamano et al. | 711/163 |
| 6,754,811 | B1* | 6/2004 | Cato et al. | 712/227 |
| 6,804,727 | B1* | 10/2004 | Rademacher | G06F 3/1204 710/305 |
| 6,823,398 | B1* | 11/2004 | Lee et al. | 710/5 |
| 6,829,596 | B1* | 12/2004 | Frazee | 705/66 |
| 6,862,632 | B1* | 3/2005 | Halstead et al. | 710/31 |
| 6,880,054 | B2* | 4/2005 | Cheng et al. | 711/164 |
| 6,986,030 | B2* | 1/2006 | Shmueli et al. | 713/1 |
| 7,165,224 | B2* | 1/2007 | Pyhalammi | 715/748 |
| 7,215,771 | B1* | 5/2007 | Hamlin | 380/44 |
| 7,216,231 | B2* | 5/2007 | Gehrmann | 713/171 |
| 7,379,102 | B2* | 5/2008 | Nakama | 348/231.1 |
| 7,415,115 | B2* | 8/2008 | Ma | 380/286 |
| 7,464,110 | B2* | 12/2008 | Pyhalammi et al. | |
| 7,523,149 | B1* | 4/2009 | Sridharan et al. | |
| 7,536,657 | B2* | 5/2009 | Shimizu et al. | 715/864 |
| 8,738,693 | B2* | 5/2014 | Julia et al. | 709/204 |
| 8,787,164 | B2* | 7/2014 | Julia et al. | 370/232 |

(Continued)

*Primary Examiner* — Andrew Georgandellis
*Assistant Examiner* — Anthony Fabbri
(74) *Attorney, Agent, or Firm* — Nixon & Vanderhye P.C.

(57) ABSTRACT

A non-volatile mass storage device is provided comprising memory circuitry accessible to a host data processing device via a communication link. The non-volatile mass storage device comprises processing circuitry for locally accessing the memory circuitry of the file system and is capable of triggering generation of a file for storage on the memory circuitry by connection of the non-volatile mass storage device to the host data processing device. The generated file comprises information dependent upon a state of the non-volatile mass storage device. A corresponding method of operating a non-volatile mass storage device is provided and a computer program is provided for obtaining the information dependent upon the state of the non-volatile mass storage device, for locally accessing the memory circuitry and for generating the file for storage on the memory circuitry.

25 Claims, 5 Drawing Sheets (56) References Cited

U.S. PATENT DOCUMENTS

| | | | | |
|---|---|---|---|---|
| 8,839,451 B1* | 9/2014 | Lam | | G06F 21/10 |
| | | | | 713/193 |
| 8,887,283 B2* | 11/2014 | Crawford | | 726/24 |
| 2001/0045985 A1* | 11/2001 | Edwards et al. | | 348/231 |
| 2001/0047348 A1* | 11/2001 | Davis | | 707/1 |
| 2002/0073410 A1* | 6/2002 | Lundback et al. | | 717/171 |
| 2002/0078367 A1* | 6/2002 | Lang et al. | | 713/200 |
| 2002/0145632 A1* | 10/2002 | Shmueli et al. | | 345/835 |
| 2002/0147653 A1* | 10/2002 | Shmueli et al. | | 705/26 |
| 2002/0162009 A1* | 10/2002 | Shmueli et al. | | 713/200 |
| 2003/0079096 A1* | 4/2003 | Murakami | | 711/156 |
| 2003/0200231 A1* | 10/2003 | Deguchi et al. | | 707/200 |
| 2004/0086124 A1* | 5/2004 | Sasaki | | 380/277 |
| 2005/0055566 A1* | 3/2005 | Huang et al. | | 713/200 |
| 2005/0114574 A1* | 5/2005 | Okamoto et al. | | 710/74 |
| 2005/0144353 A1* | 6/2005 | Long et al. | | 711/100 |
| 2006/0008253 A1* | 1/2006 | Horiguchi et al. | | 386/96 |
| 2006/0039033 A1* | 2/2006 | French et al. | | 358/1.16 |
| 2006/0294209 A1* | 12/2006 | Rosenbloom et al. | | 709/220 |
| 2007/0069897 A1* | 3/2007 | Bauchot et al. | | 340/572.1 |
| 2007/0106707 A1* | 5/2007 | Yamato | | 707/202 |
| 2007/0156850 A1* | 7/2007 | Corrion | | 709/219 |
| 2007/0168481 A1* | 7/2007 | Lambert et al. | | 709/223 |
| 2007/0195363 A1* | 8/2007 | Uno | | 358/1.15 |
| 2007/0214369 A1* | 9/2007 | Roberts | | G06F 21/79 |
| | | | | 713/192 |
| 2007/0234043 A1* | 10/2007 | Miyazawa | | 713/156 |
| 2007/0300078 A1* | 12/2007 | Ochi et al. | | 713/189 |
| 2008/0005260 A1* | 1/2008 | Belimpasakis et al. | | 709/212 |
| 2008/0046733 A1* | 2/2008 | Rodgers et al. | | 713/171 |
| 2008/0189557 A1* | 8/2008 | Pipitone et al. | | 713/193 |
| 2009/0006722 A1* | 1/2009 | McAvoy et al. | | 711/103 |
| 2009/0043963 A1* | 2/2009 | Lahcanski et al. | | 711/115 |
| 2009/0132833 A1* | 5/2009 | Jin | | 713/193 |
| 2010/0030990 A1* | 2/2010 | Asai et al. | | 711/163 |
| 2010/0138933 A1* | 6/2010 | Yamashita | | G06F 21/31 |
| | | | | 726/30 |

* cited by examiner

DATA PROCESSING ON A NON-VOLATILE MASS STORAGE DEVICE

BACKGROUND OF THE INVENTION

1. Field of the Invention

This invention relates to non-volatile mass storage devices and more particularly to storage of and access to information on mass storage devices.

2. Description of the Prior Art

Non-volatile mass storage devices such as Universal Serial Bus (USB) mass storage devices are widely used in the information technology field for convenient storage of information. Known applications of such non-volatile mass storage devices include flash discs, which can be used to store software programs that when invoked run on a host data processing system. For example, many security and data synchronization software applications are invoked in this manner. USB dongles (i.e. hardware keys) are often used to interact with some host program running on a host data processing machine.

To sign up for a service associated with a hardware or software product or to register a tool associated with a hardware product, a user typically is required to manually enter via a Website either a product serial number or activation code that the user reads from some kind of labelling providing on the hardware device itself. It is also known to use USB dongles to authenticate a piece of software and to selectively activate some aspect of that software via some form of negotiation with the host data processing device into which the USB dongle is installed. One example of such known systems is a micro controller unit board and the associated license to the on-line/off-line tools for it.

In the case of registration of product serial numbers, in known systems each serial number has to be tracked together with the product and aligned with the manufacturing/supply channel. In the case of software authentication provided by means of a USB dongle, software is required to be running on the host data processing machine in order to perform the negotiation for the authentication.

These previously known mechanisms for registration of hardware, authentication of software or indeed registration for a service or tool associated with a hardware, software or firmware product are inflexible and impractical in terms of the requirement to provide corresponding software on the host data processing device and the requirement to track serial numbers through the manufacturing chain until the point when a user activates the particular serial number. These aspects give rise to difficulties in manufacturing logistics for providing up to date software and drivers and for tracking the serial numbers.

SUMMARY OF THE INVENTION

Viewed from one aspect the present invention provides a non-volatile mass storage device comprising:

memory circuitry accessible to a host data processing device via a communication link;

processing circuitry for locally accessing said memory circuitry as a file system and for generating a file for storage on said memory circuitry;

wherein said processing circuitry is triggered to generate said file by connection of said non-volatile mass storage device to said host data processing device and said file comprises information dependent upon a state of said non-volatile mass storage device.

The present invention recognises that provision of processing circuitry on the non-volatile mass storage device itself to enable the memory circuitry of the non-volatile mass storage device to be locally accessed as a file system provides the flexibility to enable dynamic generation of a file for storage on the memory circuitry dependent upon a state of the non-volatile mass storage device. In previously known systems, memory circuitry of non-volatile mass storage devices such as Universal Serial Bus dongles would typically have to be accessed via the host to file system corresponding to the host data processing device to which the non-volatile mass storage device is connected. The capability to locally access the memory circuit of the non-volatile mass storage device provides a great deal of flexibility since the file whose generation is triggered by connection of the non-volatile mass storage device to the host data processing device can store state information such as, for example, a serial number corresponding to the non-volatile mass storage device or software, firmware or hardware version numbers corresponding to the non-volatile mass storage device. This automatic local generation of the file triggered by connection reduces the burden on the host data processing device to provide supporting software for interaction with the non-volatile mass storage device and obviates the need for a user to actively establish state information such as a serial number or version number since such state information can be stored on the non-volatile mass storage device and automatically read and stored in the file that is dynamically generated by the processing circuitry.

It will be appreciated that the file that is generated by the processing circuitry of the non-volatile mass storage device could be any type of file. However, in some embodiments the file is a file comprising information stored in a markup language. This enables the information stored in the generated file to be codified in a predetermined manner to simplify processing of that information by the host data processing device. An example of a markup language that can be used in various embodiments is Hypertext Markup Language.

It will be appreciated that the file that is generated locally by the memory processing circuitry of the non-volatile mass storage device could be used in many different ways, for example, it could simply be read by the host file system of the host data processing device in order to facilitate a hardware or software registration process. However, in one embodiment, the file comprises information for establishing a communication link between the host data processing device and a node of a network computer system. Establishing such a communication link via the locally generated file reduces the requirement to provide compatible software and/or drivers on the host data processing system since additional information can be collected via the communication link with the node of the network computer system and can also be readily centrally updated.

In one embodiment, the file locally generated by a processing circuitry of the non-volatile mass storage device is a Hypertext Markup Language (HTML) file and the communication link via which the memory circuitry is accessible to the host data processing device is a link to a World Wide Web page. This provides flexibility since dynamic generation of the file containing a link to a World Wide Web page provides accessibility to resources on the Internet for the purposes of a registration or authentication process and provides simplicity for the user who can readily activate a Hypertext link simply by clicking on the displayed link. Alternatively the user can automatically be directed via the Hyperlink text to an appropriate web page for provision of software, hardware or firmware registration or support.

It will be appreciated that access to the non-volatile mass storage device by the host data processing device could be provided prior to the local generation of the file comprising information dependent upon a state of the non-volatile mass storage device. However, in one embodiment the non-volatile mass storage device enables non-local access to memory circuitry by the host data processing device after the file has been generated by the processing circuitry. In some embodiments non-local access to the memory of the non-volatile mass storage device can also be provided prior to generation of the file and a "virtual disconnect" can be performed before the file is generated. In another embodiment non-local access to the memory circuitry by the host data processing device is enabled only after generation of the file by the processing circuitry and not before the file generation. However, in both of these cases local generation of the file is triggered by connection of the non-volatile mass storage device to the host data processing device. This provides a simple implementation.

The state information stored in the locally generated file on the non-volatile mass storage device could comprise any kind of information dependent upon a state of the non-volatile mass storage device. For example, information from a timer, configuration information etc. However, in one embodiment, the state information comprises a serial number identifying the non-volatile mass storage device. This simplifies manufacturing logistics since it obviates the need to track serial numbers or other codes until the point when someone activates that code. Instead, the serial number can be stored on the non-volatile mass storage device and transmitted directly to an authorisation site without requirement of having to align additional authorisation or product codes in the supply chain to ensure their authenticity. The serial number need not be human-readable.

It will be appreciated that the serial number corresponding to the state information that is stored in the local generated file could be stored in any location on the non-volatile mass storage device, for example, in the memory circuitry such as the flash memory of the non-volatile flash storage device. However in some embodiments the serial number is stored on the non-volatile mass storage device in a location other than on the memory circuitry. For example, the serial number could be stored in the local file system itself or in a processing chip on the non-volatile mass storage device. This can provide an additional level of security by storing the serial number in a location that is not accessible to any host device via the host file system.

It will be appreciated that in embodiments where the locally generated file comprises information for establishing a communication link between the host data processing device and a node of a network computer system, the node of the network computer system could provide any one of a wide range of different facilities, for example, a hardware or software support facility or a facility for providing new or upgraded software. However, in one embodiment, the node of the network computer system to which the local generated file establishes a communication link provides a serial number registration facility. This provides a convenient and flexible means by which to effect hardware registration that might otherwise require a manual user sign up based on a human readable product serial number associated with the device.

It will be appreciated that the state upon which the information stored in the locally generated file of the non-volatile mass storage device depends could be any one of a number of different types of state information associated with the non-volatile mass storage device. However, in one embodiment, the state comprises information corresponding to at least one of a hardware property, a software property, or a firmware property of the non-volatile mass storage device. This enables information with regard to configuration properties of the non-volatile mass storage device to be readily accessed and evaluated by a user without any requirement to have supporting analysis software installed on the host data processing device. This facilities updates to the configuration of the non-volatile mass storage device.

In one such embodiment where the state information comprises information corresponding to at least one of a hardware property, a software property, or a firmware property of the non-volatile mass storage device, at least one of the hardware property, the software property and the firmware property is a version number.

In one such embodiment where the state information corresponds to a version number for hardware, software or firmware, the locally generated file comprises information for establishing a communication link between the host data processing device and a node of network computer system for providing at least one of software update information and firmware update information for the non-volatile mass storage device. This provides an efficient mechanism via which to upgrade the non-volatile mass storage device that is convenient for the user since the user, and less susceptible to error, is not required to establish any version numbers but these are simply generated by the non-volatile mass storage device itself and stored locally in the generated file for analysis by the appropriate computer network node.

It will be appreciated that the state information stored on the non-volatile mass storage device in the locally generated file could be in an unencoded format. However, in one embodiment the processing circuitry is arranged to encode the state information and to store the encoded information to the locally generated file. The encoding can be performed by any type of encoding for example private key or public key encryption. This allows serial numbers to be validated without any prior knowledge of the individual serial numbers and discourages counterfeiters from generating duplicate or imitation serial numbers. This in turn reduces the burden in administrating the serial number registration process by avoiding the requirement to centrally store a database of valid serial numbers and avoiding the need to track those serial numbers throughout the manufacturing process.

It will be appreciated that the state information could be encoded in any one of a number of different ways, but in one embodiment the encoded state information comprises a combination of the state information a secret key generated using a hash function. This provides a level of security that is straightforward to implement since the secret key can be stored on the non-volatile mass storage device and made known to, for example, the registration server. Combination of the state information and a secret key reduces the likelihood that the state information can be extracted by a third party other than the desired party, since to extract the state information from the combination would require a knowledge of the secret key.

In one embodiment the locally generated file comprises information for establishing a communication link between the host data processing device and a node of a network computer system and a copy of the secret key is stored locally at the network node enabling decoding of the encoded state information. This provides a simple yet effective protection of potentially sensitive state information.

In one such embodiment, the state information comprises a serial number identifying the non-volatile mass storage device and the locally generated file comprises both the encoded information and a non-encoded version of the serial number. This means that the serial number in its non-encoded form is quickly accessible to a host data processing device or registration server yet the validity and authenticity of the serial number can be checked by decrypting the encoded information in order to verify the authenticity of the serial number. This increases the likelihood of detection of imitation serial numbers.

In one embodiment in which the file comprises a markup language, the markup language is HTML and the file comprises a Hyperlink to a World Wide Web application. This conveniently provides access to the user of the non-volatile mass storage device to a relevant website by simply clicking on the Hyperlink. In another embodiment, the HTML file corresponding to the locally generated file provides automatic forwarding to a World Wide Web location. This provides a different means of automatically linking a user to a relevant internet site.

It will be appreciated that the communication link via which the memory circuitry of the non-volatile mass storage device is accessed could take on different forms. However, in one embodiment, the communication link is a universal serial bus. Use of a USB communication link has the advantage that all major operating systems likely to be installed on host data processing devices are likely to natively recognise a USB mass storage device which obviates the need for any installation process and simplifies implementation.

In alternative embodiments the communication link via which the memory circuitry of the non-volatile mass storage device is accessed is a wireless communication link, for example, a Bluetooth link.

It will be appreciated that the file that is dynamically generated on the non-volatile mass storage device could be generated at the instigation of the user upon initiation of communication between the non-volatile mass storage device and a host device. In one embodiment, the processing circuitry is arranged to generate the file automatically upon connection of the non-volatile mass storage device to the host data processing device. This provides the manufacturer with a way of ensuring that registration of the device is reliably performed without relying on the user's motivation to perform the registration. It also enables resources to be accessed in a manner that is entirely convenient for the user, since the user is automatically directed to the relevant resources via automatic generation of the file.

It will be appreciated that the non-volatile mass storage device could be any kind of non-volatile mass storage device, such as a USB dongle. However, in one embodiment the non-volatile mass storage device is a microcontroller chip.

Viewed from another aspect the present invention provides a method of operating a non-volatile mass storage device having processing circuitry and memory circuitry accessible to a host data processing device via a communication link, said method comprising the steps of:

obtaining information dependent upon a state of said non-volatile mass storage device; and locally accessing said memory circuitry as a file system using said processing circuitry and generating a file for storage on said memory circuitry;

wherein generation of said file is triggered by connection of said non-volatile mass storage device to said host data processing device and said file comprises said state information.

Viewed from a further aspect the present invention provides a computer program stored on a computer readable medium for execution on a non-volatile mass storage device having processing circuitry and memory circuitry accessible to a host data processing device via a communication link, which when executed performs the steps of:

obtaining information dependent upon a state of said non-volatile mass storage device; and locally accessing said memory circuitry as a file system using said processing circuitry and generating a file for storage on said memory circuitry;

wherein generation of said file is triggered by connection of said non-volatile mass storage device to said host data processing device and said file comprises said state information.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
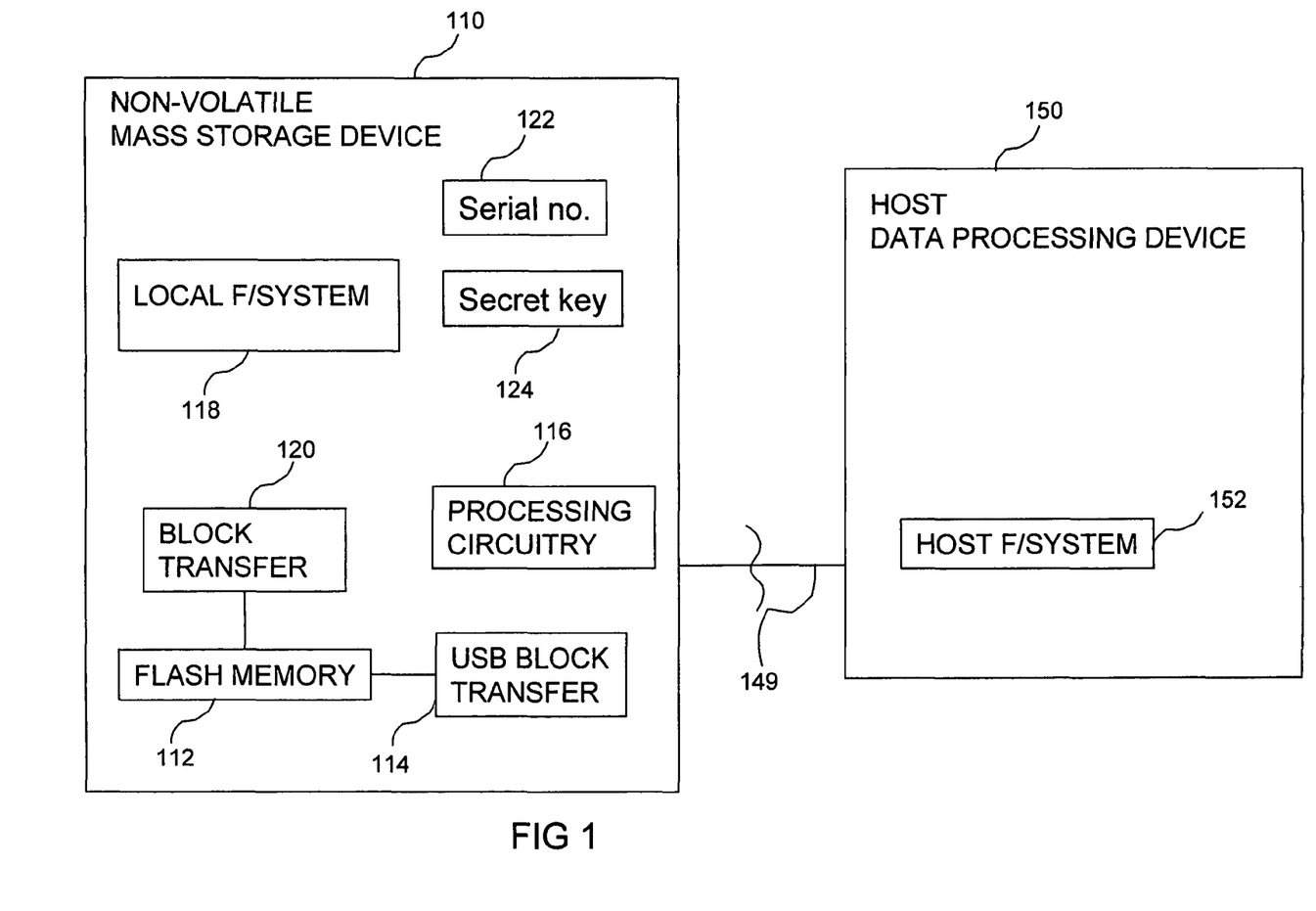
FIG. 1 schematically illustrates a non-volatile mass storage device having processing circuitry for locally accessing memory circuitry of the non-volatile mass storage device as a file system and a host data processing device with which the non-volatile mass storage device can establish a communication link.

FIG. 1 schematically illustrates a non-volatile mass storage device having processing circuitry for locally accessing memory circuitry of the non-volatile mass storage device and for generating a file for storage on the memory circuitry. FIG. 1 also shows a communication link between the non-volatile mass storage device 110 and a host data processing device 150.

The non-volatile mass storage device 110 comprises: memory circuitry comprising flash memory 112; a USB block transfer unit 114; processing circuitry 116; a local file system 118; a local block transfer unit 120; a serial number storage location 122 and a secret key storage location 124.

The host data processing device 150 is shown to comprise a host file system 152. The host data processing device 150 comprises further components which have not been illustrated for simplicity since they are not directly relevant to the functioning of the non-volatile mass storage device 110.

The non-volatile mass storage device can establish a connection with a host data processing device 150 via a communication link 149. In this embodiment, communication link is a USB communication link. In alternative embodiments the communication link 149 could be, for example, a wireless communication link such as a Bluetooth communication link. Upon establishment of the communication link with the host data processing device 150, the host file system 152 has access to the flash memory 112 of the non-volatile mass storage device 110 via the USB block transfer unit 114. The operating system (not shown) on the host data processing device 150 is provided with native support for communicating with USB mass storage devices. The USB protocol allows a plurality of peripherals to be connected to a host device using a single standardised interface socket and improves the plug-and-play capabilities by allowing devices to be connected and disconnected without a requirement to reboot the host data processing device. The USB communication link 149 and USB block transfer unit 114 enable the host file system 152 of the host data processing device 150 to read data from the flash memory 112 and write data to the flash memory 112. This means of access to the flash memory 112 of the non-volatile mass storage device 110 is entirely conventional.

The non-volatile mass storage device of FIG. 1 comprises processing circuitry 116 that enables local access to the flash memory 112 as a local file system 118 via the local block transfer unit 120. Thus the local file system 118 has access to information stored on the flash memory 112 independently of the host file system 152. In order to have access to the flash memory 112, the non-volatile mass storage device is provided with an appropriate software stack to perform the local memory accesses.

Storage locations are provided on the non-volatile mass storage device for storage of a serial number 122 that is a unique identifier for the device 110 and the secret key 124 that is used to encode information in files generated using the local file system 118. In particular, the processing circuitry is arranged to dynamically generate a file for storage on the flash memory 112 via the local block transfer unit 120. The generated file stores information comprising both the serial number 122 and the secret key 124.

Although in the embodiment of FIG. 1, special storage locations 122, 124 are shown for the serial number and the secret key, in alternative embodiments this information could be stored within the local file system 118 itself, in the flash memory 112 or indeed in any other appropriate location on the non-volatile mass storage device 110. The serial number and the secret key stored in the storage locations 122, 124 are stored on the non-volatile mass storage device at the manufacture stage. Provision of the secret key 124 means that any unique serial number 122 can be stored on a non-volatile mass storage device and the authentication can be performed later. Thus there is no requirement to keep track through the manufacturing process of the precise value of the unique serial number 122.

In this particular arrangement, upon establishment of the USB communication link 149, the processing circuitry 116 is arranged to automatically generate a file for storage on the flash memory 112 using the local file system 118. The generated file comprises HTML data and in particular a Uniform Resource Locator (URL) specifying an activation web address for a registration server accessible via the Internet for performing registration of the serial number stored in the storage location 122. Generation of the file is triggered automatically by connection of the non-volatile mass storage device 110 to the host data processing device 150. Although generation of the file is triggered by the connection, the file generation need not be performed initially upon connection. In some embodiments generation of the file is deferred until after at least on other processing task has been performed.

Figure 2:
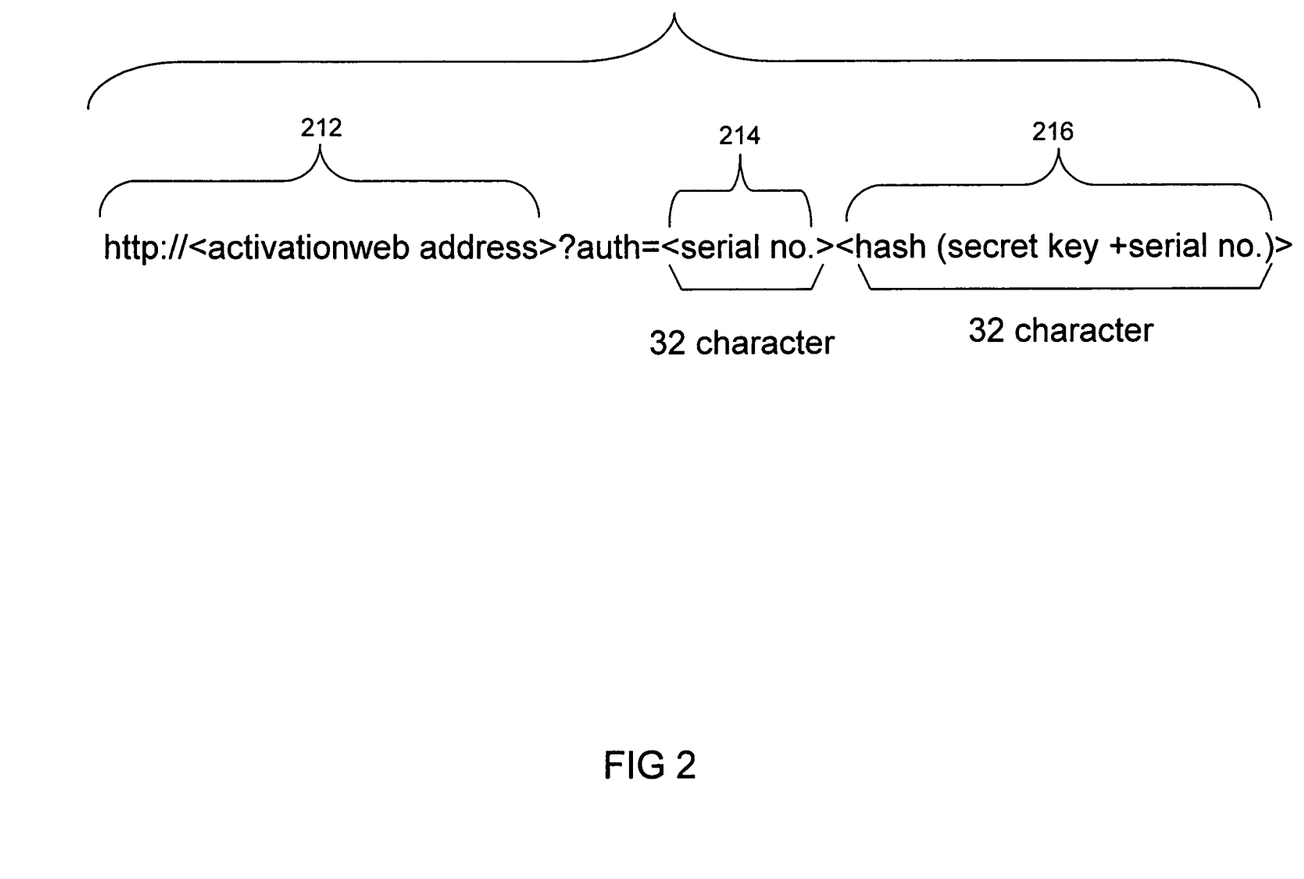
FIG. 2 schematically illustrates an example of a Uniform Resource Locator (URL) stored in the file generated by the non-volatile mass storage device of FIG. 1.

FIG. 2 schematically illustrates the form of the URL whose generation is triggered dynamically by the on-board processing circuitry 116 of the non-volatile mass storage device of FIG. 1 by connection to the host data processing device 150. The dynamically generated file is stored in the flash memory 112 as a generated file upon establishment of the connection to the host data processing device 150. The URL comprises: an activation web address 212 providing a link to a particular selected registration server; an unencoded 32-character serial number 214 corresponding to the serial number stored in the storage location 212 in FIG. 1; and a 32-character encoded value 216 comprising a hash of the combination of the secret key read from the storage location 124 in FIG. 1 and the serial number. The encoding in this embodiment is simply performed using a hash function, which is an algorithm that generates a numeric or fixed-size character output from a variable-sized piece of text or other data (in this case at least partly numeric).

The activation web address 212 is stored on the non-volatile mass storage device 110 at some point during the manufacturing process or at some point during the configuration of the non-volatile mass storage device. In this particular embodiment, the activation web address is predetermined and provides a link to a predetermined registration server. However, in alternative embodiments the activation web address could change dependent on the internal state of the non-volatile mass storage device 110. Inclusion of the unencoded (i.e. non-hashed) serial number 214 in the URL enables the serial number to be readily extracted by the registration server whilst inclusion of the encoded (hashed) combination of the secret key and the serial number facilities verification that the serial number as a valid serial number that was legitimately generated. In alternative embodiments the serial number could be encrypted and an encrypted version could be included in the URL.

The 32-character unencoded serial number 214 and the 32-character encoded combination 216 of the secret key and serial number are concatenated and the entire concatenated value is transmitted to the registration server that is specified by the activation web address 212. The activation web address 212 in this arrangement corresponds to a registration server (one example of an authorisation entity) but in alternative embodiments, the activation web address could provide any function desired depending upon the particular state information that is to be transmitted. For example, if the state information to be transmitted is a software, hardware or firmware version number rather than the serial number 214, the activation web address could correspond to the address of a server for software/hardware/firmware verification (i.e an upgrading entity).

Figure 3:
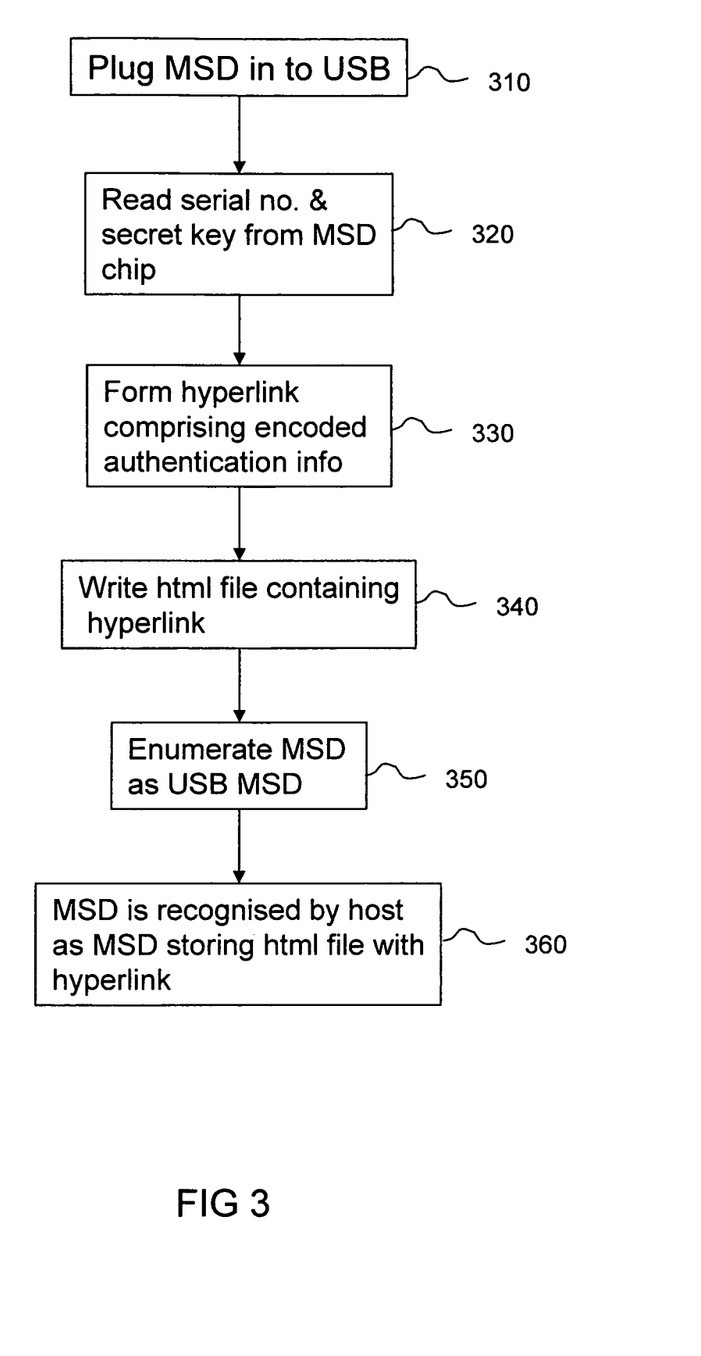
FIG. 3 is a flow chart that schematically illustrates a sequence of steps that are performed when the non-volatile mass storage device of FIG. 1 is plugged into the host data processing device of FIG. 1 via a USB link.

FIG. 3 is a flow chart that schematically illustrates a sequence of steps that are performed by a computer program stored on the flash memory 112 of the non-volatile mass storage device to effect dynamic generation of the file by the processing circuitry 116 of FIG. 1. The process begins at stage 310 where the non-volatile mass storage device 110 is plugged into a USB port of the host data processing device 150. Upon connection to the host data processing device 150, the processing circuitry 116 of the non-volatile mass storage device 110 automatically reads the unique serial number stored in the serial number storage location 122 and also reads the secret key from the secret key storage location 124 on the non-volatile mass storage device 110. The process then proceeds to stage 330 whereupon the processing circuitry 116 forms the hyperlink of FIG. 2 comprising both the non-encoded serial number and the encoded authentication information comprising both the serial number and the secret key.

Next, at stage 340, the processing circuitry 116 writes the hyperlink to a locally generated file using the local file system 118 and stores the file on the flash memory 112. The stages 320, 330 and 340 are executed by the processing circuitry 116 using computer program code stored on the flash memory 112. Thus the processing circuitry 116 is triggered to generate the file by connection of the non-volatile mass storage device 110 to the host data processing device 150. In this embodiment the file generation is triggered in an initial processing stage upon connection non-local access to the memory circuitry by the host data processing device is enabled only after generation of the file. However, in alternative embodiments non-local access to the memory of the non-volatile mass storage device can also be provided prior to generation of the file and a "virtual disconnect" can be performed before the file is generated. However, in both of these cases (file generation prior to non-local access and file generation following a virtual disconnect) local generation of the file is triggered by connection of the non-volatile mass storage device to the host data processing device.

Once the file has been generated at stage 340, the process proceeds to stage 350 whereupon the non-volatile mass storage device 110 is enumerated as a USB mass storage device using the standard USB protocol. Stage 350 is the stage that would typically initially be performed when a known USB mass storage device is plugged into a host data processing system. However the steps 320, 330 and 340 are performed prior to the initiation step 350 and are facilitated by provision of the processing circuitry 116 on the non-volatile mass storage device 110. Finally at stage 360, the non-volatile mass storage device 110 is recognised by the host data processing device 150 as a mass storage device and the host data processing device 150 has access to the generated file storing the Hyperlink via the USB block transfer unit 114 and the host file system 152.

Figure 4:
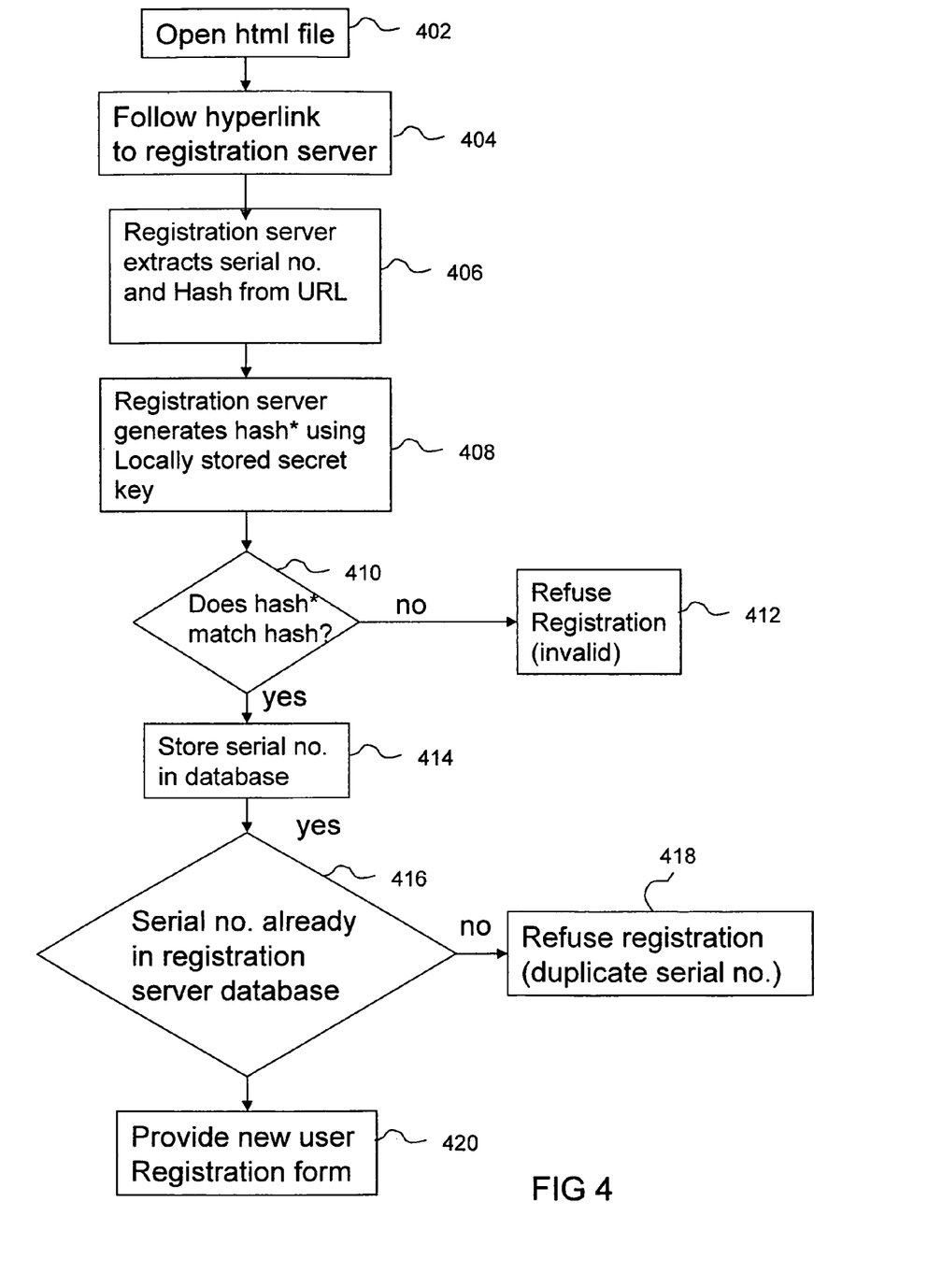
FIG. 4 is a flow chart that schematically illustrates a process performed by a host data processing device to effect registration of the non-volatile mass storage device of FIG. 1.

FIG. 4 is a flow chart that schematically illustrates a sequence of steps performed by a registration server specified by the activation web address 210 of FIG. 2 when performing registration of the non-volatile mass storage device 110 of FIG. 1. The process begins at stage 402 whereupon the user opens the HTML file that was generated following connection of between the host data processing device 150 and the non-volatile mass storage device 110. This file, which is stored on the flash memory 112, is accessed by the host data processing device via the host file system 152 and the USB block transfer unit 114 and retrieved from the flash memory 112 of the non-volatile mass storage device 110.

Next, at stage 404, the user either clicks the Hyperlink stored in the retrieved file or is automatically directed to the registration server web page via the HTML code in the generated file. The process then proceeds to stage 406 whereupon access to the registration server is provided via the host data processing device 150 and the registration server extracts the serial number 114 and the hashed (i.e. encoded) combination of the secret key and serial number 216 (see FIG. 2) from the URL of the stored Hyperlink. Next, at stage 408, the registration server takes the non-encoded serial number 214 and generates a hashed combination of this serial number with a locally stored version of the secret key. The process then proceeds to stage 410 where the registration server makes a comparison between (i) hash* generated at stage 408 using the version of the secret key stored by the registration server and the serial number extracted from the URL with (ii) the encoded value 216 obtained directly from the URL (i.e. hashed combination extracted directly from the URL). If there is no match between these two values, it indicates that the serial number was not validly generated (e.g. because the generator of the serial number did not have access to the secret key). In this event the process proceeds to stage 412 whereupon the registration server refuses registration as a result of an invalid serial number.

If, on the other hand, at stage 410 the hash* value generated by the registration server does in fact match the encrypted value 216 extracted from the URL, then the process proceeds to stage 414 where an attempt is made to store the extracted serial number in a database corresponding to the registration server. However, at stage 416 a check is performed by the registration server to determine whether or not the serial number is already present in the registration server database. If the serial number is already present then the process proceeds to stage 418 where registration is refused as a consequence of a duplicated serial number. This ensures that even if a serial number is cloned, a given serial number can be used only once to effect a valid registration. If, on the other hand, the serial number is not already stored in the registration server database, the process proceeds from stage 416 to stage 420 whereupon the new user is provided with a registration form. Once the user has registered, depending access or selective access is be provided to a range of information and services with regard to the hardware, software or firmware being registered.

Figure 5A:
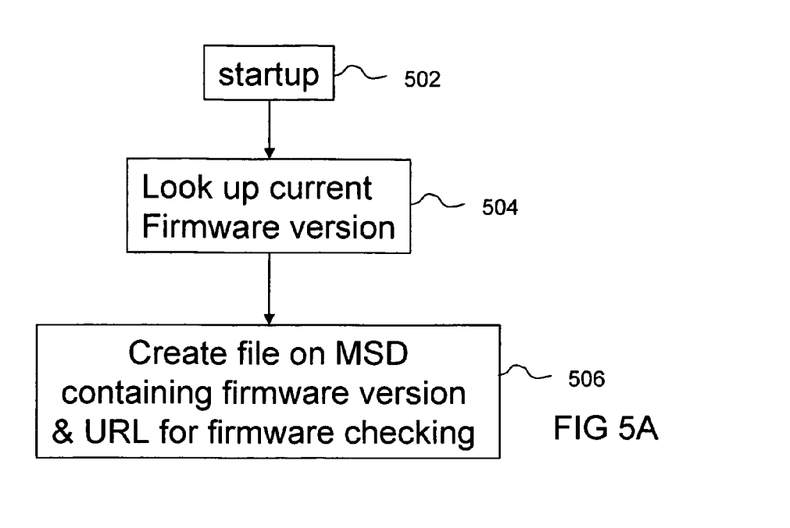
FIG. 5A is a flow chart that schematically illustrates a sequence of steps performed by the non-volatile mass storage device of FIG. 1 for the purpose of performing a firmware version check.

FIG. 5A is a flow chart that schematically illustrates a process performed by the non-volatile mass storage device 110 of FIG. 1 as part of a hardware or firmware verification process. The process begins at stage 502 whereupon the non-volatile mass storage device is started up via connection to the host data processing device 150. Next at stage 504 the processing circuitry 116 of the non-volatile mass storage device executes program code that enables it to look up a current hardware or firmware version associated with a state of the non-volatile mass storage device. This information is predetermined and stored at some location on the non-volatile mass storage device at the manufacturing stage. This is similar to the storage of the serial number 122 shown in FIG. 1.

Next, at stage 506, the processing circuitry creates a file on the non-volatile mass storage device 110 using the local file system 118. The generated file comprises the newly established firmware version information or hardware version information determined at stage 504 together with a URL specifying a World Wide Web location via which hardware and/or firmware version checking can be performed.

Figure 5B:
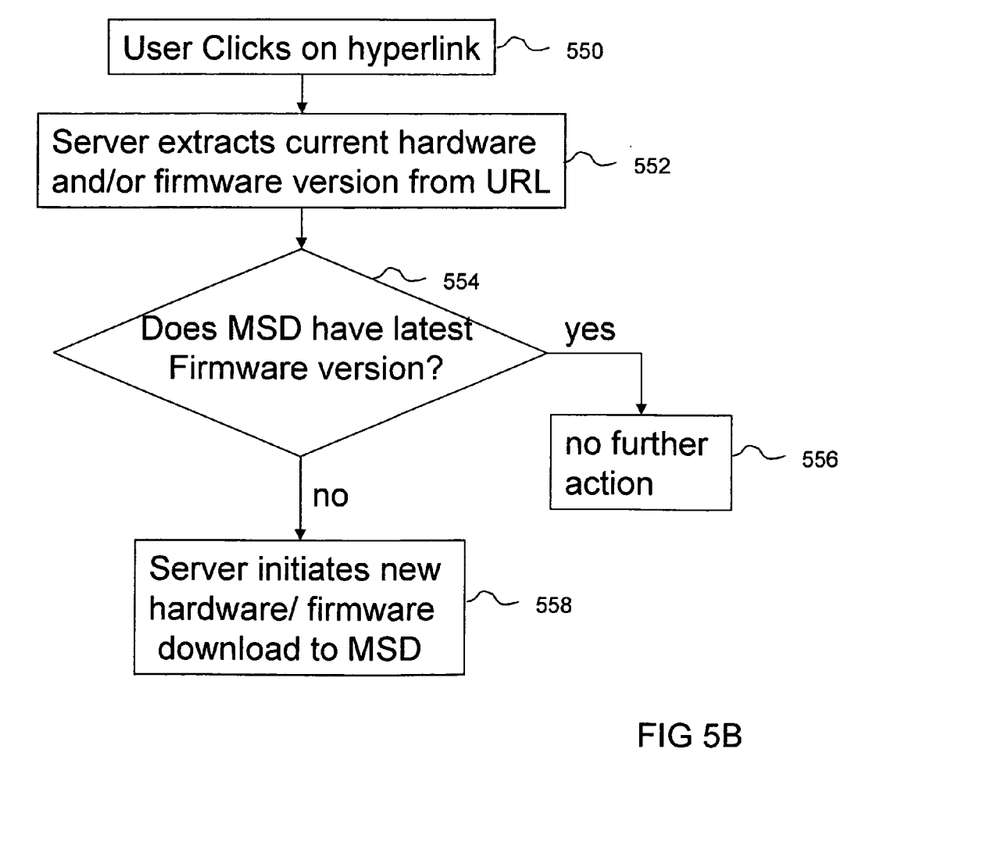
FIG. 5B is a flow chart that is complementary to the flow chart of FIG. 5A and illustrates a sequence of steps performed by a user making use of the file that was generated by the non-volatile mass storage device to effect a firmware check on the non-volatile mass storage device.

FIG. 5B is a flow chart that is complementary to the flow chart of FIG. 5A and which illustrates the steps performed by the user via a hardware/firmware verification website for performing the verification process. The process begins at stage 550 whereupon a user clicks on a Hyperlink contained in a dynamically file stored on the non-volatile mass storage device 110. Access to this Hyperlink is provided via the host file system 152 and the USB block transfer unit 114 of FIG. 1. Next, at stage 552, the server extracts the current hardware and/or firmware version from the URL in a similar manner to the way that the serial number 214 and the encrypted state information 216 were extracted in the example of the FIG. 2 URL. The process then proceeds to stage 554 where it is determined whether or not the non-volatile mass storage device 110 has the latest hardware and/or firmware version. The information to determine whether or not the versions are the latest ones is stored on the verification server without any requirement for supporting the software on the host data processing device 110. If at stage 554 it is established that the latest versions of firmware and/or hardware are in fact installed on a non-volatile mass storage device, then the process proceeds to stage 556 and no further action is required. However, on the other hand, if at stage 554 it is determined that at least one of the hardware or firmware versions are not the latest version then the process proceeds to stage 558 whereupon the verification server initiates a new hardware and/or firmware download to the non-volatile mass storage device 110.

Although in the above embodiments we have described dynamic generation of a file by the processing circuitry 116 using the local file system of a non-volatile mass storage device 110, the file that is generated to store the dynamically generated URL need not be a new file but could amount to generation of an old file which is modified to include the URL information and the state information. Thus the file that is generated for storage on the flash memory 112 of the non-volatile mass storage device 110 could be either an entirely new file or a modified version of a pre-existing file.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A non-volatile mass storage device comprising:
memory circuitry remotely accessible by a host file system of a host data processing device via a communication link;
processing circuitry in said non-volatile mass storage device, the processing circuitry being configured to locally access said memory circuitry in said non-volatile mass storage device as a local file system and to generate a file for storage on said memory circuitry;
wherein said processing circuitry in said non-volatile mass storage device is configured to be triggered to locally access state information stored on said non-volatile mass storage device, and to dynamically generate said file comprising data derived from said state information, by connection of said non-volatile mass storage device to said host data processing device independent of said host file system of said host data processing device and without any interaction with software executed on said host data processing device, and
wherein said state information comprises a combination of a serial number of said non-volatile mass storage device and a secret key generated using a hash function.

2. A non-volatile mass storage device as claimed in claim 1, wherein said file is a Hypertext Markup Language file.

3. A non-volatile mass storage device as claimed in claim 1, wherein said file comprises information for establishing a communication link between said host data processing device and a node of a network computer system.

4. A non-volatile mass storage device as claimed in claim 3, wherein said file is a Hypertext Markup Language file and wherein said communication link is a link to a World Wide Web page.

5. A non-volatile mass storage device as claimed in claim 1, wherein said non-volatile mass storage device enables non-local access to said memory circuitry by said host data processing device after said file has been generated by said processing circuitry.

6. A non-volatile mass storage device as claimed in claim 5, wherein non-local access to said memory circuitry by said host data processing device is enabled only after generation of said file by said processing circuitry.

7. A non-volatile mass storage device as claimed in claim 1, wherein said serial number is stored on said non-volatile mass storage device in a location other than on said memory circuitry.

8. A non-volatile mass storage device as claimed in claim 1, wherein said file comprises information for establishing a communication link between said host data processing device and a node of a network computer system providing a serial number registration facility.

9. A non-volatile mass storage device as claimed in claim 1, wherein said state comprises information corresponding to at least one of a hardware property, a software property or a firmware property of said non-volatile mass storage device.

10. A non-volatile mass storage device as claimed in claim 8, wherein at least one of said hardware property, said software property and said firmware property is a version number.

11. A non-volatile mass storage device as claimed in claim 10, wherein said file comprises information for establishing a communication link between said host data processing device and a node of a network computer system for providing at least one of software update information and firmware update information for said non-volatile mass storage device.

12. A non-volatile mass storage device as claimed in claim 1, wherein said file comprises information for establishing a communication link between said host data processing device and a node of a network computer system and wherein a copy of said secret key is stored locally at said node enabling decoding of said encoded state information.

13. A non-volatile mass storage device as claimed in claim 12, wherein said state information comprises a serial number identifying said non-volatile mass storage device and said file comprises both said combination and a non-encoded version of said serial number.

14. A non-volatile mass storage device as claimed in claim 2, wherein said Hypertext Markup Language file comprises a hyperlink to a World Wide Web location.

15. A non-volatile mass storage device as claimed in claim 2, wherein said Hypertext Markup Language file provides automatic forwarding to a World Wide Web location.

16. A non-volatile mass storage device as claimed in claim 1, wherein said communication link is a Universal Serial Bus.

17. A non-volatile mass storage device as claimed in claim 1, wherein said communication link is a wireless communication link.

18. A non-volatile mass storage device as claimed in claim 1, wherein said processing circuitry is arranged to generate said file automatically upon connection of said non-volatile mass storage device to said host data processing device.

19. A non-volatile mass storage device as claimed in claim 1, wherein said non-volatile mass storage device is a microcontroller chip.

20. A non-volatile mass storage device as claimed in claim 1, wherein said non-volatile mass storage device is a Universal Serial Bus mass storage device.

21. A method of operating a non-volatile mass storage device having processing circuitry and memory circuitry remotely accessible by a host file system of a host data processing device via a communication link, said method comprising the steps of:
obtaining information dependent upon a state of said non-volatile mass storage device; and
locally accessing said memory circuitry in said non-volatile mass storage device as a local file system using said processing circuitry in said non-volatile mass storage device and generating a file for storage on said memory circuitry;

wherein local access of state information stored on said non-volatile mass storage device, and dynamic generation of said file comprising data derived from said state information, is triggered by connection of said non-volatile mass storage device to said host data processing device independent of said host file system of said host data processing device and without any interaction with software executing on said host data processing device, and wherein said state information comprises a combination of a serial number of said non-volatile mass storage device and a secret key generated using a hash function.

22. A method of serial number registration using a non-volatile mass storage device having processing circuitry and memory circuitry remotely accessible by a host file system of a host data processing device via a communication link, said method comprising the steps of:

obtaining information dependent upon a state of said non-volatile mass storage device; and locally accessing said memory circuitry in said non-volatile mass storage device as a local file system using said processing circuitry in said non-volatile mass storage device and generating a file for storage on said memory circuitry;

wherein local access of state information stored on said non-volatile mass storage device, and dynamic generation of said file comprising data derived from said state information, is triggered by connection of said non-volatile mass storage device to said host data processing device independent of said host file system of said host data processing device and without any interaction with software executing on said host data processing device, and wherein said state information comprises a combination of a serial number of said non-volatile mass storage device and a secret key generated using a hash function, and from which a serial number is derivable for transmission to an authorization entity.

23. The method as claimed in claim 22, wherein said serial number is stored in hardware of said non-volatile mass storage device prior to generation of said file.

24. A computer program product stored on a non-transitory computer readable storage medium for execution on a non-volatile mass storage device having processing circuitry and memory circuitry remotely accessible by a host file system of a host data processing device via a communication link, which computer program, when executed, performs the steps of:

obtaining information dependent upon a state of said non-volatile mass storage device; and locally accessing said memory circuitry in said non-volatile mass storage device as a local file system using said processing circuitry in said non-volatile mass storage device and generating a file for storage on said memory circuitry;

wherein local access of state information stored on said non-volatile mass storage device, and dynamic generation of said file comprising data derived from said state information, is triggered by connection of said non-volatile mass storage device to said host data processing device independent of said host file system of said host data processing device and without any interaction with software executing on said host data processing device, and wherein said state information comprises a combination of a serial number of said non-volatile mass storage device and a secret key generated using a hash function.

25. A non-volatile mass storage device comprising:

means for storing data such that said data is remotely accessible by a host file system of a host data processing device via a communication link;

means for processing in said non-volatile mass storage device for locally accessing said means for storing data in said non-volatile mass storage device as a local file system and for generating a file for storage on said means for storing data;

wherein said means for processing in said non-volatile mass storage device is configured to be triggered to state information stored on said non-volatile mass storage device, and to dynamically generate said file comprising data derived from said state information, by connection of said non-volatile mass storage device to said host data processing device independent of said host file system of said host data processing device and without any interaction with software executed on said host data processing device, and wherein said state information comprises a combination of a serial number of said non-volatile mass storage device and a secret key generated using a hash function.

* * * * *